United States Patent [19]

Raynes

[11] Patent Number: 4,462,924
[45] Date of Patent: Jul. 31, 1984

[54] LIQUID CRYSTAL MATERIALS AND DEVICES

[75] Inventor: Edward P. Raynes, Malvern, England

[73] Assignee: The Secretary of State in Her Britannic Majesty's Government of the United Kingdom of Great Britain and Northern Ireland, London, England

[21] Appl. No.: 416,608

[22] Filed: Sep. 10, 1982

Related U.S. Application Data

[63] Continuation of Ser. No. 72,692, Sep. 5, 1979, abandoned.

[30] Foreign Application Priority Data

Sep. 13, 1978 [GB] United Kingdom ............... 36595/78
Oct. 13, 1978 [GB] United Kingdom ............... 40580/78

[51] Int. Cl.³ .......................... C09K 3/34; G02F 1/13
[52] U.S. Cl. .......................... 252/299.63; 252/299.5; 252/299.65; 252/299.66; 252/299.67
[58] Field of Search ................. 350/350 R; 252/299.5, 252/299.63, 299.64, 299.65, 299.66, 299.67

[56] References Cited

U.S. PATENT DOCUMENTS

| | | | |
|---|---|---|---|
| 3,974,087 | 8/1976 | Gray et al. | 252/299.66 |
| 4,011,173 | 3/1977 | Steinstrasser | 252/299.5 |
| 4,017,416 | 4/1977 | Inukai et al. | 252/299.65 |
| 4,077,260 | 3/1978 | Gray et al. | 252/299.66 |
| 4,113,647 | 9/1978 | Coates et al. | 252/299.62 |
| 4,120,567 | 10/1978 | Goodman et al. | 252/299.66 |
| 4,130,502 | 12/1978 | Eidenschink et al. | 252/299.63 |
| 4,137,192 | 1/1979 | Matsufuji | 252/299.5 |
| 4,141,853 | 2/1979 | Hibino et al. | 252/299.64 |
| 4,147,651 | 4/1979 | Oh | 252/299.64 |
| 4,154,697 | 5/1979 | Eidenschink et al. | 252/299.63 |
| 4,198,130 | 4/1980 | Boller et al. | 252/299.5 |
| 4,227,778 | 10/1980 | Raynes | 252/299.66 |
| 4,253,740 | 3/1981 | Raynes et al. | 252/299.63 |
| 4,285,829 | 8/1981 | Eidenschink et al. | 252/299.63 |
| 4,309,304 | 1/1982 | Harrison et al. | 252/299.63 |
| 4,372,871 | 2/1983 | Toriyama et al. | 252/299.63 |
| 4,410,445 | 10/1983 | Baur et al. | 252/299.5 |

FOREIGN PATENT DOCUMENTS

| | | | |
|---|---|---|---|
| 2636684 | 2/1978 | Fed. Rep. of Germany | 252/299.63 |
| 2745050 | 4/1978 | Fed. Rep. of Germany | 252/299.63 |
| 2837218 | 3/1979 | Fed. Rep. of Germany | 252/299.1 |
| 2402694 | 4/1979 | France | 252/299.63 |
| 137597 | 9/1979 | German Democratic Rep. | 252/299.63 |
| 51-107292 | 9/1976 | Japan | 252/299.66 |
| 54-121286 | 9/1979 | Japan | 252/299.63 |
| 56-2370 | 1/1981 | Japan | 252/299.63 |
| 56-2371 | 1/1981 | Japan | 252/299.66 |
| 56-118481 | 9/1981 | Japan | 252/299.63 |
| 1456359 | 11/1976 | United Kingdom | 252/299.65 |
| 2080820 | 2/1982 | United Kingdom | 252/299.66 |

OTHER PUBLICATIONS

Gray, C. W. et al., Electronics Lett., vol. 11, No. 23, pp. 556–557 (1975).
Gray, C. W. et al., Mol. Cryst. Liq. Cryst., vol. 37, pp. 189–211 (1976).

*Primary Examiner*—Teddy S. Gron
*Attorney, Agent, or Firm*—Stevens, Davis, Miller & Mosher

[57] ABSTRACT

A liquid crystal for use in liquid display devices comprises at least one material from group 1 comprising:

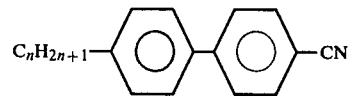

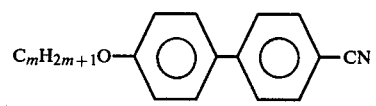

at least one of the group 1 materials having $n=2$, or 4; and at least one material from group 2 comprising:

together with an ester liquid crystal material.

The ester forms between 10% and 90% (preferably between 30% and 70%) by weight of the total mixture and the group 2 material forms between 5% and 30% by weight of the total mixture.

Examples of the esters have the general formula where $R_1$, $R_2$ represent alkyl or alkoxy groups, and where $R_3$, $R_4$ represent alkyl groups.

All alkyl and alkoxy end groups are unbranched.

14 Claims, 8 Drawing Figures

LIQUID CRYSTAL MATERIALS AND DEVICES

This is a continuation of application Ser. No. 72,692 filed Sept. 5, 1979, now abandoned.

This invention relates to liquid crystal materials and to devices incorporating such materials.

Liquid crystal devices are commonly formed by enclosing a thin, typically 7 to 12 μm thick, layer of a liquid crystal material between glass slides. Electrode structures on the slides enable a voltage to be applied across the layer and change the molecular alignment of the liquid crystal molecules. This causes an observable effect which can be used in displays of various types, for example, digital watches, small calculators, voltage meters, etc. There are a number of different types of liquid crystal devices, for example, phase change effect, dynamic scattering, twisted nematic devices, etc.

This invention is concerned with the so-called twisted nematic device which in its OFF, zero applied voltage, state is optically active i.e. it rotates the plane of plane polarised by usually 90° (determined by surface treatment to the slides e.g. unidirectional rubbing to provide molecular alignment along the rubbing direction). Such a device loses its optical activity i.e. its rotary power on application of a suitable voltage to provide an ON state. Thus when placed between crossed, or parallel, polarisers the device can be used as an optical shutter to display information as determined by the electrode pattern and applied voltage.

One method of applying voltages is called multiplexing and involved application of different voltages in a predetermined sequence. This can result in the liquid crystal layer receiving two non zero voltage levels; one such level must be below and the other above a device threshold voltage at which the device changes from an OFF to an ON state.

A problem common to some displays is that at normal viewing incidence a display may appear OFF but at say a 45° incidence the display appears ON thus giving ambiguous readings on digital displays.

Another problem with some displays is that the threshold voltage changes with temperature. Thus a display may be adequate at one temperature but inoperable at a different temperature. One way of reducing this threshold voltage change with temperature is to mix different types of liquid crystal materials as, for example, taught in U.K. P.A. No. 45,627/77 (and corresponding U.S. Pat. No. 4,227,778). This discloses mixtures of a material having crystalline nematic-isotropic phases with a material having crystalline-nematic-smectic-nematic-isotropic phases. The resulting mixture does not show a smectic phase.

Yet another problem in small displays, e.g. wrist watches, is the provision of an adequate voltage level. It is an advantage for the device threshold voltage to be as low as possible e.g. below 3 volts so that standard 1.5 voltage batteries may be used. Co-pending application No. 37,956/77 (and corresponding U.S. Pat. No. 4,253,740) discloses various mixtures of materials having low threshold voltages. Examples of such mixtures are cyano biphenyls where x is a short n-alkyl group $C_nH_{2n+1}$ (n is an even integer) or X is a short n-alkoxy group $C_mH_{2m+1}$ (m is an odd integer). Preferably $n \leq 6$, $m \leq 5$.

Ideally a liquid crystal mixture used in multiplexed displays would show no angular ambiguity, no threshold voltage variation with temperature, and a low operating voltage. Inevitably a material cannot meet all these criteria and is a compromise. An object of this invention is to provide a material which is an improvement on some presently available materials.

According to this invention a liquid crystal material for use in liquid crystal displays comprises at least one material from a Group 1 liquid crystal material comprising:

at least one of the group 1 materials having n=2, 4 or m=3; at least one liquid crystal material from a group 2 liquid crystal material comprising:

(trans isomer)

(trans isomer)

$C_sH_{2s+1}$—⟨O⟩—⟨O⟩—⟨O⟩—CN and a group 3 ester liquid crystal material, with the ester material forming between 10% and 90% by weight of the total mixture and with the group 2 material forming between 5% and 30% by weight of the total mixture.

Preferably the amount of group 3 ester is between 30% and 70% by weight of the total material. The group 3 ester has no terminal cyano group.

The group 3 ester material may be of the type where $R_1$ $R_2$ are alkyl or alkoxy groups. In one preferred ester $R_1$ $R_2$ are both n-alkyl.

The ester may be the mixture

⅔ by weight

⅓ by weight obtainable from E Merck Co., Darmstadt, as ZLI 1052.
Another ester has the general formula:

where $R_3$, $R_4$ are alkyl.

In the above m, n, p, q, r, s are integers. The alkyl and alkoxy groups in all the above are unbranched (i.e. normal).

The biphenyl materials may have integer n=0, 2, 4, 6, inclusive, and odd integers of m=1, 3, 5, inclusive.

For some applications the biphenyl materials may have low values of n=even integer i.e. n=0, 2, 4, 6 and m=odd integer i.e. m=1, 3, 5 as a mixture whose average value of n, m is low, i.e. below 6.

The biphenyls may also include values of n=1, 3, 5, m=2, 4, 6.

For some applications n and m may include low values e.g. n=1, 3, 5 and m=2, 4 in combinations where the average value of n, m is low i.e. less than 5.

According to an aspect of this invention a liquid crystal display device comprises a liquid crystal material mixture according to this invention formed into a layer contained between two slides, at least one of which is transparent, both carrying electrode structures and both surface treated to provide a progressive liquid crystal molecular twist across the layer.

The device may be arranged between crossed, or parallel, linear polarisers. A reflector may be located adjacent to one polariser so the display may be observed by reflected light. The reflector may be partly reflecting and a tungsten light (or other suitable light source) arranged to illuminate the display through the reflector as required.

The invention will now be described by way of example only with reference to the accompanying drawings wherein.

The display of FIGS. 1 to 4 comprises a cell 1, formed of two, front and back, glass slides 2, 3 respectively, spaced 7 μm apart by a spacer 4 all held together by an epoxy resin glue. In front of the front glass slide 2 is a front polariser 5 arranged with its axis of polarisation axis horizontal. A reflector 7 is arranged behind the back polariser 6.

Figure 3:
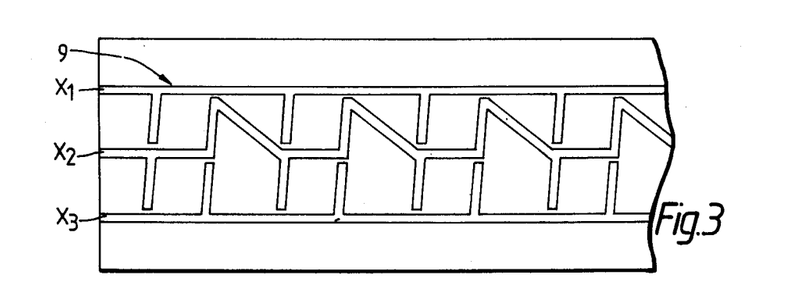
FIG. 3 shows a rear electrode configuration for FIG. 1.
Figure 4:
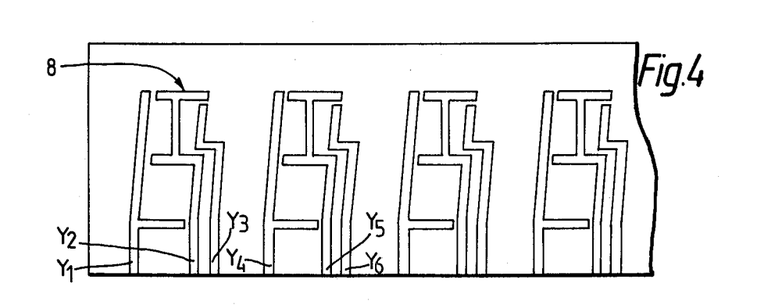
FIG. 4 shows a front electrode configuration for FIG. 1.

Electrodes 8, 9 of tin oxide typically 100 Å thick are deposited on the inner faces of the slides 2, 3 as a complete layer and etched to the shapes shown in FIGS. 3, 4. The display has seven bars per digit 10 plus a decimal point 11 between each digit. As shown in FIG. 3 the rear electrode structure is formed into three electrodes $x_1$, $x_2$, $x_3$. Similarly the front electrode structure is formed into three electrodes per digit and decimal point $y_1$, $y_2$, $y_3$ . . . . Examination of the six electrodes per digit show that each of the eight elements can independently have a voltage applied thereto by application of suitable voltage to appropriate x, y electrodes.

Figure 1:
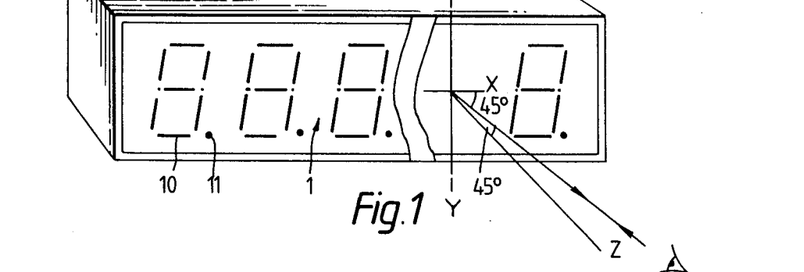
FIG. 1 is a sectional view of a digital display.
Figure 2:
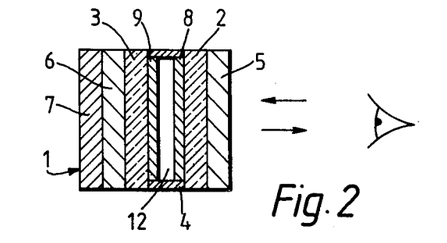
FIG. 2 is a sectional view of FIG. 1.

Prior to assembly the inner faces of slides 2, 3 are cleaned then eg dipped in a solution of 0.2% by weight of poly vinyl alcohol (PVA) in water. When dry, the slides are rubbed in a single direction with a soft tissue then assembled with the rubbing direction orthogonal and parallel to the optical axis of the adjacent polariser. When a nematic liquid crystal material 12 is introduced between the slides 2, 3 the molecules at the slide surface lie along the rubbing direction with a progressive twist between the slides.

When zero voltage is applied to the cell 1 light passes through the front polariser 5, through the cell 1 (whilst having its plane of polarisarion rotated 90°) through its rear polariser 6 to the reflector 7 where it is reflected back again to an observer. When a voltage above a threshold value is applied between two electrodes 8, 9 the voltage crystal layer 12 loses its rotary power. Thus light at that position does not reach the reflector 7 and does not reflect back to the observer who sees a dark display of one or more bars of a digit 10.

Figure 5:
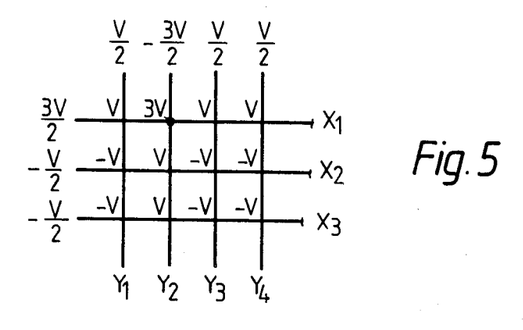
FIGS. 5, 6, 7 show schematic views of the device of FIGS. 1 to 4 with typical addressing voltages.
Figure 6:
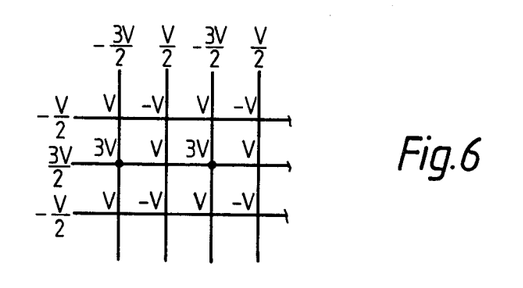
Figure 7:
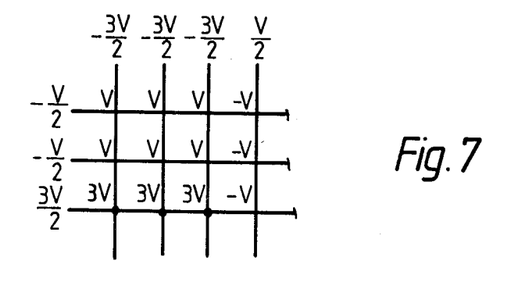

Voltages are applied as follows as shown in FIGS. 5, 6 and 7 for three successive time intervals. A voltage of 3 V/2 is swept down each x electrode in turn whilst −V/2 is applied to the remaining x electrodes. Meanwhile −3 V/2 or V/2 is applied to the y electrodes. A coincidence of 3 V/2 and −3 V/2 at an intersection results in 3 V across the liquid crystal layer. Elsewhere the voltage is V or −V. Thus by applying −3 V/2 to approximate y electrodes as the 3 V/2 is swept down the x electrodes selected intersections are turned ON as indicated by solid circles. The electric voltage V is an a.c. signal of e.g. 100 Hz square wave, and the sign indicates the phase.

Each OFF intersection receives V for all three time periods whilst each ON intersection receives 3 V followed by V then V for the three time period making an r.m.s. value of 1.91 V=V ON: V OFF=V.

The voltage at which a display is OFF and ON may be defined as follows and with reference to FIGS. 1 and 8. Mutually perpendicular axes X, Y, Z are shown in FIG. 1 to lie in the surface and normal respectively to the slide 2, 3 surface. Light is shone through a transmissive display (i.e. as in FIG. 2 without the reflector) along the Z axis and observed along this axis. The voltage is increased until only 10% of the maximum possible light is transmitted, this is an ON state and designated $V_{10}(0°)$ i.e. 10% transmission at 0° incidence. The OFF state may be defined as when at least 90% of the maximum possible light is transmitted.

Figure 8:
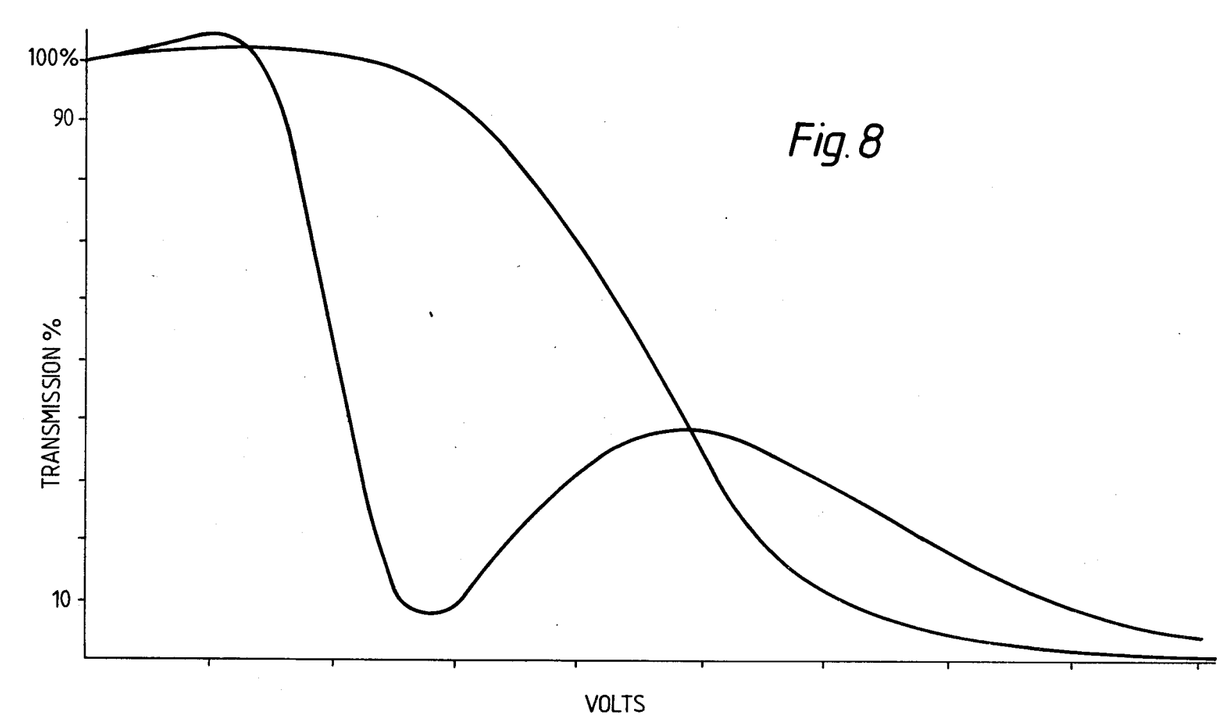
FIG. 8 is a graph showing how light transmission through a twisted nematic cell arranged between crossed polarisers varies with applied voltage.

If light is transmitted and observed at 45° to the X, Y, Z axes (45° to a rubbing direction) a different transmission curve is seen as shown in FIG. 8. The OFF state i.e. 90% transmission, $V_{90}(45°)$ occurs at a lower voltage than at normal incidence. Of the four possible directions which are at 45° to both rubbing directions, the direction is chosen which has the lowest value of $V_{90}(45°)$.

Therefore, for an unambiguous display V OFF must be below $V_{90}(45°)$ and V ON must be above $V_{10}(0°)$. Ideally the ratio $V_{10}(0°)/V_{90}(45°)$ should be unity but this is not obtainable. Liquid crystal mixtures according to this invention provide low values of $V_{10}(0°)/V_{90}(45°)$. Another characteristic is variation in the V OFF, V ON with temperature. One useful parameter is $$\frac{1}{V}\left(\frac{\Delta V}{\Delta T}\right)_{0°-40°}$$

where $\Delta V$ is the voltage change over a temperature range $\Delta T$ of 20° to 40° C. and V is the average voltage. Both V and $\Delta V$ are measured for 90° transmission (i.e. OFF) at normal (0°) (or 45°) incidence.

Examples of liquid crystal mixtures follow with their characteristics listed in Table 1.

EXAMPLE 1

|  | weight % |
|---|---|
| $C_2H_5$—⟨O⟩—⟨O⟩—CN | 15 |
| $C_4H_9$—⟨O⟩—⟨O⟩—CN | 15 |
| $C_3H_7O$—⟨O⟩—⟨O⟩—CN | 10 |
| $C_5H_{11}$—⟨O⟩—⟨O⟩—⟨O⟩—CN | 10 |
| ZLI 1052 | 50 |

EXAMPLE 2

|  | weight % |
|---|---|
| ⟨O⟩—⟨O⟩—CN | 5 |
| $C_2H_5$—⟨O⟩—⟨O⟩—CN | 15 |
| $C_4H_9$—⟨O⟩—⟨O⟩—CN | 10 |
| $C_3H_7O$—⟨O⟩—⟨O⟩—CN | 10 |
| $C_5H_{11}$—⟨O⟩—⟨O⟩—⟨O⟩—CN | 10 |
| ZLI 1052 | 50 |

EXAMPLE 3

|  | weight % |
|---|---|
| $C_6H_{13}$—⟨O⟩—⟨O⟩—CN | 35 |
| $C_3H_7O$—⟨O⟩—⟨O⟩—CN | 10 |
| $C_5H_{11}$—⟨O⟩—⟨O⟩—⟨O⟩—CN | 10 |
| ZLI 1052 | 45 |

EXAMPLE 4

|  | weight % |
|---|---|
| $C_2H_5$—⟨O⟩—⟨O⟩—CN | 5 |
| $C_6H_{13}$—⟨O⟩—⟨O⟩—CN | 25 |
| $C_3H_7O$—⟨O⟩—⟨O⟩—CN | 10 |
| $C_5H_{11}$—⟨O⟩—⟨O⟩—⟨O⟩—CN | 10 |
| ZLI 1052 | 50 |

EXAMPLE 5

|  | weight % |
|---|---|
| $C_2H_5$—⟨O⟩—⟨O⟩—CN | 15 |
| $C_4H_9$—⟨O⟩—⟨O⟩—CN | 15 |
| $C_3H_7O$—⟨O⟩—⟨O⟩—CN | 10 |
| $C_2H_5$—⟨H⟩—C(=O)—O—⟨O⟩—⟨O⟩—CN | 15 |
| ZLI 1052 | 45 |

EXAMPLE 6

|  | weight % |
|---|---|
| ⟨O⟩—⟨O⟩—CN | 5 |
| $C_2H_5$—⟨O⟩—⟨O⟩—CN | 15 |

-continued

| | weight % |
|---|---|
| C$_4$H$_9$—⟨O⟩—⟨O⟩—CN | 10 |
| C$_3$H$_7$O—⟨O⟩—⟨O⟩—CN | 10 |
| C$_2$H$_5$—⟨H⟩—C(=O)—O—⟨O⟩—⟨O⟩—CN | 15 |
| ZLI 1052 | 45 |

EXAMPLE 7

| | weight % |
|---|---|
| C$_6$H$_{13}$—⟨O⟩—⟨O⟩—CN | 30 |
| C$_3$H$_7$O—⟨O⟩—⟨O⟩—CN | 10 |
| C$_2$H$_5$—⟨H⟩—C(=O)—O—⟨O⟩—⟨O⟩—CN | 15 |
| ZLI 1052 | 45 |

EXAMPLE 8

| | weight % |
|---|---|
| C$_2$H$_5$—⟨O⟩—⟨O⟩—CN | 15 |
| C$_4$H$_9$—⟨O⟩—⟨O⟩—CN | 15 |
| C$_3$H$_7$O—⟨O⟩—⟨O⟩—CN | 10 |
| C$_5$H$_{11}$—⟨O⟩—⟨O⟩—⟨O⟩—CN | 10 |
| C$_5$H$_{11}$—⟨O⟩—⟨O⟩—C(=O)—O—⟨O⟩—⟨O⟩—CN | 5 |
| ZLI 1052 | 45 |

EXAMPLES 9–19

| | weight % |
|---|---|
| Biphenyl | 45 |
| 5CT = C$_5$H$_{11}$—⟨O⟩—⟨O⟩—⟨O⟩—CN | 11 |
| ZLI 1052 | 44 |

-continued

| Example No. | biphenyl |
|---|---|
| 9 | C$_2$H$_5$—⟨O⟩—⟨O⟩—CN |
| 10 | C$_3$H$_7$—⟨O⟩—⟨O⟩—CN |
| 11 | C$_4$H$_9$—⟨O⟩—⟨O⟩—CN |
| 12 | C$_5$H$_{11}$—⟨O⟩—⟨O⟩—CN |
| 13 | C$_6$H$_{13}$—⟨O⟩—⟨O⟩—CN |
| 14 | C$_7$H$_{15}$—⟨O⟩—⟨O⟩—CN |
| 15 | C$_8$H$_{17}$—⟨O⟩—⟨O⟩—CN |
| 16 | C$_9$H$_{19}$—⟨O⟩—⟨O⟩—CN |
| 17 | C$_{10}$H$_{21}$—⟨O⟩—⟨O⟩—CN |
| 18 | C$_{11}$H$_{23}$—⟨O⟩—⟨O⟩—CN |
| 19 | C$_{12}$H$_{25}$—⟨O⟩—⟨O⟩—CN |

EXAMPLE 20

| | weight % |
|---|---|
| C$_2$H$_5$—⟨O⟩—⟨O⟩—CN | 5 |
| C$_6$H$_{13}$—⟨O⟩—⟨O⟩—CN | 30 |
| C$_3$H$_7$O—⟨O⟩—⟨O⟩—CN | 10 |
| C$_5$H$_{11}$—⟨O⟩—⟨O⟩—⟨O⟩—CN | 10 |
| ZLI 1052 | 45 |

EXAMPLE 21

| | weight % |
|---|---|
| C$_4$H$_9$—⟨O⟩—⟨O⟩—CN | 13 |

-continued

| | weight % |
|---|---|
| C$_6$H$_{13}$—⬡—⬡—CN | 30.5 |
| C$_5$H$_{11}$—⬡—⬡—⬡—CN | 10 |
| C$_7$H$_{15}$—⬡—⬡—C(O)—O—⬡—⬡—CN | 3.5 |
| CH$_3$O—⬡—C(O)—O—⬡—C$_3$H$_7$ | 17 |
| CH$_3$O—⬡—C(O)—O—⬡—C$_5$H$_{11}$ | 17 |
| CH$_3$O—⬡—C(O)—O—⬡—C$_7$H$_{15}$ | 9 |

EXAMPLES 22–27

| | weight % |
|---|---|
| C$_2$H$_5$—⬡—⬡—CN | 15 |
| C$_4$H$_9$—⬡—⬡—CN | 15 |
| C$_3$H$_7$O—⬡—⬡—CN | 10 |
| C$_2$H$_5$—⬢(H)—C(O)—O—⬡—⬡—CN | 15 |
| CH$_3$O—⬡—C(O)—O—⬡—C$_5$H$_{11}$ | 20 |
| X | 25 |

Example 22  X = C$_2$H$_5$O—⬡—C(O)—O—⬡—C$_5$H$_{11}$

Example 23  X = C$_3$H$_7$O—⬡—C(O)—O—⬡—C$_5$H$_{11}$

Example 24  X = C$_5$H$_{11}$O—⬡—C(O)—O—⬡—C$_5$H$_{11}$

Example 25  X = C$_6$H$_{13}$O—⬡—C(O)—O—⬡—C$_5$H$_{11}$

Example 26  X = C$_7$H$_{15}$O—⬡—C(O)—O—⬡—C$_5$H$_{11}$

Example 27  X = C$_{12}$H$_{25}$O—⬡—C(O)—O—⬡—C$_5$H$_{11}$

EXAMPLE 28

| | weight % |
|---|---|
| C$_2$H$_5$—⬡—⬡—CN | 15 |
| C$_4$H$_9$—⬡—⬡—CN | 15 |
| C$_3$H$_7$O—⬡—⬡—CN | 10 |
| C$_2$H$_5$—⬢(H)—C(O)—O—⬡—⬡—CN | 15 |
| CH$_3$O—⬡—C(O)—O—⬡—C$_5$H$_{11}$ | 25 |
| CH$_3$O—⬡—C(O)—O—⬡—C$_7$H$_{15}$ | 20 |

EXAMPLE 29

| | weight % |
|---|---|
| C$_6$H$_{13}$—⬡—⬡—CN | 45 |
| C$_5$H$_{11}$—⬡—⬡—⬡—CN | 10 |
| CH$_3$O—⬡—C(O)—O—⬡—C$_5$H$_{11}$ | 25 |
| CH$_3$O—⬡—C(O)—O—⬡—C$_7$H$_{15}$ | 20 |

EXAMPLE 30

| | weight % |
|---|---|
| C$_6$H$_{13}$—⬡—⬡—CN | 35 |
| C$_3$H$_7$O—⬡—⬡—CN | 10 |

-continued

| | weight % |
|---|---|
| C₅H₁₁—⌬—⌬—⌬—CN | 10 |
| CH₃O—⌬—C(=O)—O—⌬—C₅H₁₁ | 25 |
| CH₃O—⌬—C(=O)—O—⌬—C₇H₁₅ | 20 |

EXAMPLE 31

| | weight % |
|---|---|
| C₂H₅—⌬—⌬—CN | 15 |
| C₄H₉—⌬—⌬—CN | 15 |
| C₃H₇O—⌬—⌬—CN | 10 |
| C₅H₁₁—⌬—⌬—⌬—CN | 10 |
| C₅H₁₁—⌬—⌬—C(=O)—O—⌬—⌬—CN | 5 |
| C₂H₅—⌬—C(=O)—O—⌬—C₅H₁₁ | 20 |
| C₅H₁₁—⌬—C(=O)—O—⌬—C₅H₁₁ | 25 |

EXAMPLE 32

| | weight % |
|---|---|
| C₅H₁₁—⌬—⌬—⌬—CN | 10 |
| C₅H₁₁—⌬—⌬—C(=O)—O—⌬—⌬—CN | 5 |
| CH₃—⌬—C(=O)—O—⌬—C₅H₁₁ | 40 |
| C₅H₁₁—⌬—C(=O)—O—⌬—C₅H₁₁ | 45 |

EXAMPLE 33

| | weight % |
|---|---|
| C₂H₅—⌬—⌬—CN | 15 |
| C₄H₉—⌬—⌬—CN | 15 |
| C₃H₇O—⌬—⌬—CN | 10 |
| C₂H₅—H—C(=O)—O—⌬—CN | 15 |
| C₅H₁₁—⌬—⌬—C(=O)—O—⌬—CN | 5 |
| CH₃—⌬—C(=O)—O—⌬—C₅H₁₁ | 20 |
| C₅H₁₁—⌬—C(=O)—O—⌬—C₅H₁₁ | 20 |

EXAMPLE 34

| | weight % |
|---|---|
| C₂H₅—⌬—⌬—CN | 15 |
| C₄H₉—⌬—⌬—CN | 16 |
| C₃H₇O—⌬—⌬—CN | 10 |
| C₅H₁₁—⌬—⌬—⌬—CN | 10 |
| C₅H₁₁—⌬—⌬—C(=O)—O—⌬—CN | 4 |
| CH₃—⌬—C(=O)—O—⌬—C₅H₁₁ | 20 |
| C₅H₁₁—⌬—C(=O)—O—⌬—C₅H₁₁ | 25 |

EXAMPLE 35

| | weight % |
|---|---|
| C₅H₁₁—H—⌬—⌬—CN | 15 |

-continued

| Structure | weight % |
|---|---|
| $C_2H_5-[H]-\overset{O}{\underset{\|}{C}}-O-\bigcirc-\bigcirc-CN$ | 10 |
| $CH_3-\bigcirc-\overset{O}{\underset{\|}{C}}-O-\bigcirc-C_5H_{11}$ | 35 |
| $C_5H_{11}-\bigcirc-\overset{O}{\underset{\|}{C}}-O-\bigcirc-C_5H_{11}$ | 40 |

EXAMPLES 36, 37

| Structure | Example 36 weight % | Example 37 weight % |
|---|---|---|
| $C_2H_5-\bigcirc-\bigcirc-CN$ | 15 | 15 |
| $C_4H_9-\bigcirc-\bigcirc-CN$ | 15 | 10 |
| $C_3H_7O-\bigcirc-\bigcirc-CN$ | 10 | 10 |
| $C_5H_{11}-[H]-\bigcirc-\bigcirc-CN$ | 10 | 10 |
| $C_2H_5-[H]-\overset{O}{\underset{\|}{C}}-O-\bigcirc-\bigcirc-CN$ | 10 | 10 |
| $CH_3-\bigcirc-\overset{O}{\underset{\|}{C}}-O-\bigcirc-C_5H_{11}$ | 20 | 20 |
| $C_5H_{11}-\bigcirc-\overset{O}{\underset{\|}{C}}-O-\bigcirc-C_5H_{11}$ | 20 | 25 |

EXAMPLES 38, 39

| Structure | Example 38 weight % | Example 39 weight % |
|---|---|---|
| $C_2H_5-\bigcirc-\bigcirc-CN$ | 10 | 5 |
| $C_3H_7O-\bigcirc-\bigcirc-CN$ | 10 | 10 |
| $C_5H_{11}-[H]-\bigcirc-\bigcirc-CN$ | 10 | 10 |
| $C_2H_5-[H]-\overset{O}{\underset{\|}{C}}-O-\bigcirc-\bigcirc-CN$ | 10 | 10 |
| $CH_3-\bigcirc-\overset{O}{\underset{\|}{C}}-O-\bigcirc-C_5H_{11}$ | 25 | 30 |
| $C_5H_{11}-\bigcirc-\overset{O}{\underset{\|}{C}}-O-[H]-C_5H_{11}$ | 35 | 35 |

EXAMPLE 40

| Structure | weight % |
|---|---|
| $C_2H_5-\bigcirc-\bigcirc-CN$ | 10 |
| $C_5H_{11}-[H]-\bigcirc-\bigcirc-CN$ | 10 |
| $C_2H_5-[H]-\overset{O}{\underset{\|}{C}}-O-\bigcirc-\bigcirc-CN$ | 10 |
| $CH_3-\bigcirc-\overset{O}{\underset{\|}{C}}-O-\bigcirc-C_5H_{11}$ | 30 |
| $C_5H_{11}-\bigcirc-\overset{O}{\underset{\|}{C}}-O-\bigcirc-C_5H_{11}$ | 40 |

EXAMPLES 41, 42

| Structure | Example 41 weight % | Example 42 weight % |
|---|---|---|
| $C_2H_5-\bigcirc-\bigcirc-CN$ | 15 | 15 |
| $C_4H_9-\bigcirc-\bigcirc-CN$ | 20 | 25 |
| $C_5H_{11}-[H]-\bigcirc-\bigcirc-CN$ | 10 | 10 |
| $C_2H_5-[H]-\overset{O}{\underset{\|}{C}}-O-\bigcirc-\bigcirc-CN$ | 12 | 10 |
| $CH_3-\bigcirc-\overset{O}{\underset{\|}{C}}-O-\bigcirc-C_5H_{11}$ | 20 | 20 |
| $C_5H_{11}-\bigcirc-\overset{O}{\underset{\|}{C}}-O-\bigcirc-C_5H_{11}$ | 23 | 20 |

EXAMPLES 43 TO 47

| | weight % |
|---|---|
| C₂H₅—⟨◯⟩—⟨◯⟩—CN | 15 |
| C₄H₉—⟨◯⟩—⟨◯⟩—CN | 23 |
| C₅H₁₁—⟨H⟩—⟨◯⟩—⟨◯⟩—CN | 10 |
| C₂H₅—⟨H⟩—C(=O)—O—⟨◯⟩—⟨◯⟩—CN | 12 |
| X | 40 |

Example 43  X = CH₃—⟨◯⟩—C(=O)—O—⟨◯⟩—C₅H₁₁

Example 44  X = C₃H₇—⟨◯⟩—C(=O)—O—⟨◯⟩—C₅H₁₁

Example 45  X = C₅H₁₁—⟨◯⟩—C(=O)—O—⟨◯⟩—C₅H₁₁

Example 46  X = C₃H₇—⟨◯⟩—C(=O)—O—⟨◯⟩—C₃H₇

Example 47  X = C₄H₉—⟨◯⟩—C(=O)—O—⟨◯⟩—C₇H₁₅

EXAMPLES 48, 49

| | Example 48 weight % | Example 49 weight % |
|---|---|---|
| C₂H₅—⟨◯⟩—⟨◯⟩—CN | 15 | 15 |
| C₄H₉—⟨◯⟩—⟨◯⟩—CN | 22 | 20 |
| C₅H₁₁—⟨H⟩—⟨◯⟩—⟨◯⟩—CN | 11 | 12 |
| C₂H₅—⟨H⟩—C(=O)—O—⟨◯⟩—⟨◯⟩—CN | 12 | 12 |
| C₃H₇—⟨◯⟩—C(=O)—O—⟨◯⟩—C₅H₁₁ | 40 | 41 |

EXAMPLE 50

A mixture as for example 48 but with 0.5% of C 15 (formula given later) added to remove reverse twist; this is maximum suggested amount.

EXAMPLE 51

| | weight % |
|---|---|
| C₂H₅—⟨◯⟩—⟨◯⟩—CN | 15 |
| C₄H₉—⟨◯⟩—⟨◯⟩—CN | 15 |
| C₃H₇O—⟨◯⟩—⟨◯⟩—CN | 10 |
| C₂H₅—⟨H⟩—C(=O)—O—⟨◯⟩—⟨◯⟩—CN | 15 |
| C₃H₇—C(=O)—O—⟨◯⟩—⟨H⟩—C₃H₇ | 45 |

The last detailed compound is a Merck compound designated ZLI 1305 and may replace the group 3 ester material used in previous examples.

TABLE 1A

| Example | Melting Point °C. | Clearing (isotropic) Point °C. | Viscosity cSt 20° C. | Viscosity cSt 0° C. | Birefringence Δn | V₉₀(45°) volts 20° C. | V₁₀(0°) volts 20° C. | V₁₀(0°)/V₉₀(45°) | (1/V)(ΔV/ΔT) 0–40° %/°C. |
|---|---|---|---|---|---|---|---|---|---|
| 1 | −4 | 60 | 57 | 276 | 0.194 | 1.07 | 1.87 | 1.75 | 0.57 |
| 2 | | 54 | 55 | 265 | 0.188 | 1.0 | 1.78 | 1.78 | 0.74 |
| 3 | | 60 | 62 | 316 | 0.193 | 1.21 | 2.07 | 1.71 | 0.67 |
| 4 | | 60 | 64 | 311 | 0.191 | 1.175 | 2.01 | 1.71 | 0.67 |
| 5 | −4 | 64 | 63 | 315 | 0.185 | 1.07 | 1.82 | | 0.44 |
| 6 | | 60 | | | | 1.04 | 1.80 | | 0.6 |
| 7 | | 69 | | | | 1.22 | 2.06 | | 0.54 |
| 8 | | 77 | | | | 1.13 | 1.92 | | 0.46 |
| 9 | | | | | | 0.9 | 1.60 | 1.78 | |
| 10 | | | | | | 1.10 | 1.92 | 1.75 | |
| 11 | | | | | | 1.05 | 1.81 | 1.72 | |
| 12 | | | | | | 1.21 | 2.08 | 1.72 | |
| 13 | | | | | | 1.19 | 2.03 | 1.70 | |

TABLE 1A-continued

| Example | Melting Point °C. | Clearing (isotropic) Point °C. | Viscosity cSt 20° C. | Viscosity cSt 0° C. | Birefringence $\Delta n$ | $V_{90}(45°)$ volts 20° C. | $V_{10}(0°)$ volts 20° C. | $\dfrac{V_{10}(0°)}{V_{90}(45°)}$ | $\dfrac{1}{V}\left(\dfrac{\Delta V}{\Delta T}\right)$ 0–40° %/°C. |
|---|---|---|---|---|---|---|---|---|---|
| 14 | | | | | | 1.37 | 2.33 | 1.70 | |
| 15 | | | | | | 1.35 | 2.28 | 1.69 | |
| 16 | | | | | | 1.45 | 2.49 | 1.72 | |
| 17 | | | | | | 1.45 | 2.46 | 1.70 | |
| 18 | | | | | | 1.50 | 2.52 | 1.68 | |
| 19 | | | | | | 1.50 | 2.54 | 1.69 | |

TABLE 1B

| Example | Melting Point °C. | Clearing (isotropic) Point °C. | Viscosity cP 20° C. | Viscosity cP 0° C. | Birefringence $\Delta n$ | $V_{90}(45°)$ volts | $V_{10}(0°)$ volts | $\dfrac{V_{10}(0°)}{V_{90}(45°)}$ | $\dfrac{1}{V}\left(\dfrac{\Delta V}{\Delta T}\right)$ 0–40° %/°C. |
|---|---|---|---|---|---|---|---|---|---|
| 20 | −4 | 63 | 61 | 298 | 0.193 | 1.16 | 1.94 | 1.67 | 0.64 |
| 21 | −10 | 63 | 64 | | | 1.12 | 1.90 | 1.70 | 0.60 |
| 22 | | 68 | 60 | | | 1.07 | 1.76 | 1.64 | 0.36 |
| 23 | | 60 | 65 | | | 1.06 | 1.73 | 1.63 | 0.57 |
| 24 | | 53 | 66 | | | 1.10 | 1.81 | 1.65 | 0.60 |
| 25 | | 63 | 66 | | | 1.11 | 1.87 | 1.68 | 0.35 |
| 26 | | 64 | 66 | | | 1.11 | 1.85 | 1.67 | 0.52 |
| 27 | | | | | | 1.19 | 2.01 | 1.69 | 0.68 |
| 28 | | 62 | 48 | | | 1.00 | 1.73 | 1.73 | 0.53 |
| 29 | −3 | | | | | 1.12 | 1.90 | 1.70 | 0.67 |
| 30 | −3 | 61 | | | | 1.14 | 1.91 | 1.67 | 0.73 |
| 31 | | 61 | 37 | 168 | | 1.09 | 1.88 | 1.72 | 0.80 |
| 32 | 19 | 51 | | | | 1.91 | 3.07 | 1.60 | 0.60 |
| 33 | | 74 | 40 | 186 | 0.188 | 1.04 | 1.82 | 1.75 | 0.50 |
| 34 | | 62 | 37 | 153 | 0.192 | 1.06 | 1.77 | 1.67 | 0.68 |
| 35 | −4 | 68 | | | | 1.77 | 2.85 | 1.61 | 0.56* |
| 36 | −8 | 64 | 45 | 198 | 0.182 | 1.07 | 1.82 | 1.70 | 0.49 |
| 37 | −12 | 61 | | | | 1.12 | 1.87 | 1.67 | 0.49 |
| 38 | −6 | 65 | 47 | 214 | 0.163 | 1.30 | 2.12 | 1.63 | 0.62 |
| 39 | −2 | 55 | | | | 1.36 | 2.24 | 1.65 | 0.62 |
| 40 | −2 | 60 | 41 | 163 | 0.148 | 1.43 | 2.31 | 1.62 | 0.64 |
| 41 | −4 | 63 | 43 | 168 | 0.172 | 1.08 | 1.81 | 1.68 | 0.46 |
| 42 | | 57 | | | 0.172 | 1.02 | 1.73 | 1.70 | 0.56 |
| 43 | | 61 | | | | 1.03 | 1.74 | 1.69 | 0.46 |
| 44 | −10 | 59 | 46 | 178 | 0.171 | 1.03 | 1.70 | 1.65 | 0.55 |
| 45 | | 63 | | | | 1.08 | 1.81 | 1.68 | ** |
| 46 | | 60 | | | | 1.01 | 1.70 | 1.68 | 0.62 |
| 47 | | 59 | | | | 1.13 | 1.87 | 1.65 | *** |
| 48 | −11 | 62 | 45 | 178 | 0.173 | 1.03 | 1.73 | 1.68 | 0.49 |
| 49 | −11 | 66 | 46 | 185 | 0.174 | 1.08 | 1.83 | 1.69 | 0.58 |
| 50 | | | | | | 1.05 | 1.80 | 1.71 | 0.56 |
| 51 | −3 | 55 | 28 | 122 | 0.152 | 1.08 | 1.83 | 1.69 | 0.77 |

*smectic ($S_A$) to nematic at +2° C.
**$S_A$ at ~0° C.
***$S_A$ at ~10° C.

As a comparison of properties, Table 2 shows characteristics of commercially available mixtures of biphenyls/terphenyls.

TABLE 2

| | E7 | E25M |
|---|---|---|
| $V_{90}(45°)$ | 1.08 | 0.95 |
| $V_{10}(0°)$ | 1.96 | 1.75 |
| $V_{10}(0°)/V_{90}(45°)$ | 1.81 | 1.84 |
| $\dfrac{1}{V_{90}(0°)}\left(\dfrac{\Delta V_{90}(0°)}{\Delta T}\right)_{0.-40°}$ | 0.85 | 0.85 |

| E7 is | weight % |
|---|---|
| $C_5H_{11}$—⟨◯⟩—⟨◯⟩—CN | 51 |
| $C_7H_{15}$—⟨◯⟩—⟨◯⟩—CN | 25 |
| $C_8H_{17}$—⟨◯⟩—⟨◯⟩—CN | 16 |
| $C_5H_{11}$—⟨◯⟩—⟨◯⟩—⟨◯⟩—CN | 8 |

| E25M is | weight % |
|---|---|
| $C_6H_{13}$—⟨◯⟩—⟨◯⟩—CN | 35 |
| $C_8H_{17}$—⟨◯⟩—⟨◯⟩—CN | 30 |
| $C_3H_7O$—⟨◯⟩—⟨◯⟩—CN | 10 |

TABLE 2-continued

Small amounts of a cholesteric material may be added to the nematic material to induce a preferred twist in the molecules in the liquid crystal layer. This and the use of appropriate slide surface treatment removes the problems of display patchiness as taught in U.K. Patent Serial Numbers 1,472,247 and 1,478,592 (and corresponding U.S. Pat. No. 4,084,844). Suitable cholesteric materials are:

up to 0.5% by weight up to 0.05% by weight

Other cholesteric materials may be used to provide a cholesteric pitch in the complete mixture between 1500 and 300 microns.

Small amounts of pleochroic dye may be added to enhance the display contrast, e.g. the dye described in U.K. patent application No. 42,810/77 (and corresponding U.S. patent application Ser. No. 951,519 filed Oct. 30, 1978).

I claim:

1. A liquid crystal material for multiplex addressed liquid crystal displays comprising
   (1) at least one member selected from the group consisting of wherein m and n are integers and n=2 or 4 or m=3 in at least one of said materials,
   (2) a liquid crystal material comprising a member selected from the group consisting of wherein p, q, r, and s are integers, and
   (3) at least one ester having the formula wherein R$_1$ and R$_2$ are straight chain alkyl;
   said ester (3) forming between 10% and 90% by weight of the total mixture and said liquid crystal material (2) forming between 5% and 30% by weight of the total mixture.

2. A liquid crystal material as claimed in claim 1 and further including a compound of the formula selected from the group consisting of where m and n are each integers of 6 or less.

3. A liquid crystal material as claimed in claim 2 comprising $C_nH_{2n+1}$—⟨O⟩—⟨O⟩—CN, wherein n is 0, 2, 4, or 6.

4. A liquid crystal material as claimed in claim 1 wherein R$_1$ is an alkyl group having between 1 and 5 carbon atoms.

5. A liquid crystal material as claimed in claim 1 wherein R$_2$ is an alkyl group having between 3 and 7 atoms.

6. A liquid crystal material as claimed in claim 1 wherein the amount of ester is between 30% and 70% of the total material.

7. A liquid crystal material as claimed in claim 1 wherein p=2.

8. A liquid crystal material as claimed in claim 1 wherein q=5.

9. A liquid crystal material as claimed in claim 1 wherein r=5 or 7.

10. A liquid crystal material as claimed in claim 1 wherein s=5.

11. A liquid crystal material as claimed in claim 1 wherein a small amount of a cholesteric liquid crystal material is added to the mixture to provide a cholesteric pitch between 1500 and 300 microns.

12. A liquid crystal material as claimed in claim 11 wherein up to 0.5% by weight of cholesteric material, is added to the mixture.

13. A liquid crystal material as claimed in claim 11 wherein up to 0.05% by weight of cholesteric material, is added to the mixture.

14. A liquid crystal display device comprising a layer of a liquid crystal material as claimed in claim 1 formed into a layer contained between two slides, at least one of which slides is transparent, both carrying electrode structures and both surface-treated to provide a progressive liquid crystal molecular twist across the layer.

* * * * *